(12) United States Patent
Schoenek et al.

(10) Patent No.: US 7,303,495 B2
(45) Date of Patent: Dec. 4, 2007

(54) CONTINUOUSLY VARIABLE TRANSMISSION CASE COVER

(75) Inventors: Norman Schoenek, Novi, MI (US); Charles Harsch, Belleville, MI (US)

(73) Assignee: General Motors Corporation, Detroit, MI (US)

( * ) Notice: Subject to any disclaimer, the term of this patent is extended or adjusted under 35 U.S.C. 154(b) by 631 days.

(21) Appl. No.: 10/833,335

(22) Filed: Apr. 27, 2004

(65) Prior Publication Data
US 2005/0239591 A1    Oct. 27, 2005

(51) Int. Cl.
*F16H 7/00*     (2006.01)
*B62J 13/00*    (2006.01)
*F16C 43/00*    (2006.01)

(52) U.S. Cl. ............ 474/144; 74/606 R; 384/542

(58) Field of Classification Search ........ 474/144–146, 474/8, 12, 18, 28, 46; 74/606 R, 606 A; 310/51, 89, 91; 248/640, 647, 612–613; 384/493, 519, 540, 542, 906
See application file for complete search history.

(56) References Cited

U.S. PATENT DOCUMENTS

| | | | |
|---|---|---|---|
| 3,469,897 A * | 9/1969 | Rike | 384/542 |
| 4,386,812 A * | 6/1983 | Anderson | 384/542 |
| 4,539,866 A | 9/1985 | Koivunen | 475/210 |
| 5,562,349 A * | 10/1996 | Nespodzany et al. | 384/493 |
| 5,637,806 A * | 6/1997 | Baryshnikov et al. | 73/862.21 |
| 6,287,227 B1 | 9/2001 | Vahabzadeh et al. | 474/28 |
| 6,338,688 B1 * | 1/2002 | Minami et al. | 474/144 |
| 6,357,756 B1 * | 3/2002 | Matovich | 277/520 |
| 6,398,683 B1 * | 6/2002 | Fukuda | 474/144 |
| 6,727,619 B1 * | 4/2004 | Blum | 310/91 |
| 7,001,293 B2 * | 2/2006 | Lubben | 474/8 |

FOREIGN PATENT DOCUMENTS

JP    05-157117 A  *  6/1993  ............. 384/542

* cited by examiner

*Primary Examiner*—Marcus Charles

(57) ABSTRACT

A case cover for a continuously variable transmission includes a wall having a plurality of fastening elements thereon and at which a sheave assembly is rotatably mountable. The wall forms at least a portion of a cavity for containing at least a portion of the sheave assembly. Two surfaces define a slot that is configured to position and positively locate a portion of the bearing retainer to result in coarse alignment of bearing retainer fastening elements with the case cover fastening elements. The bearing retainer fastening elements are preferably protruding nuts, and the case cover fastening elements are preferably tapered holes configured to further align the nuts for engagement with threaded fasteners.

11 Claims, 3 Drawing Sheets

CONTINUOUSLY VARIABLE TRANSMISSION CASE COVER

TECHNICAL FIELD

This invention relates to continuously variable transmissions having a case cover defining a concavity in which a sheave assembly is rotatably mounted to the case cover, and a locating feature to provide alignment between fastening elements on the sheave assembly and fastening elements on the case cover.

BACKGROUND OF THE INVENTION

Continuously variable transmissions (CVT) of the variable pulley or sheave type include an input sheave assembly and an output sheave assembly operatively interconnected by a flexible transmitter, such as a belt or chain. Each of the sheave assemblies has a piston in fluid communication with a pressurized fluid source, and is configured such that the distance from the sheave assembly's axis of rotation to where the flexible transmitter engages the sheave assembly is responsive to fluid pressure acting on the piston. Thus, the transmission ratio is varied by selectively changing the fluid pressure acting on each sheave assembly's piston.

Each sheave assembly is rotatable about an axis; thus, fluid is supplied to each sheave assembly axially, i.e., along the sheave assembly's axis of rotation, from a fluid passageway connected to the pressurized fluid source. The sheave assemblies are at least partially contained in a transmission housing, or case, which is closed by a case cover.

SUMMARY OF THE INVENTION

A case cover for a continuously variable transmission is provided. The continuously variable transmission includes a sheave assembly having a bearing retainer with a plurality of bearing retainer fastening elements thereon. The case cover includes a wall that at least partially defines a cavity sufficiently sized and shaped to contain a portion of the sheave assembly. A plurality of case cover fastening elements on the wall are engageable with the bearing retainer fastening elements to rotatably mount the sheave assembly to the case cover. The case cover also includes two surfaces defining a slot configured to contain a portion of the bearing retainer.

The cavity has an open end for receiving the portion of the sheave assembly, and the slot has an open end for receiving the portion of the bearing retainer. The slot is sufficiently positioned and shaped such that the plurality of bearing retainer fastening elements substantially align with the plurality of case cover fastening elements when the portion of the bearing retainer is inserted sufficiently into the slot.

In a preferred embodiment, the slot is tapered to facilitate the insertion of the portion of the bearing retainer into the slot. Preferably, the case cover fastening elements are holes formed in the wall, and the bearing retainer fastening elements are integral nuts that protrude from the surface of the bearing retainer. The holes are tapered such that they are widest in the direction of the cavity and thus further guide the integral nuts into position for engagement with threaded fasteners such as bolts.

In a preferred embodiment, the case cover member is sufficiently sized and shaped so that the bearing retainer deforms when the nuts sufficiently engage the bolts, thereby resulting in a lateral force exerted by the nuts to lock the threads of the bolts.

The invention facilitates one-piece construction of the case cover member because a transmission assembler can align the fastening elements of the bearing retainer and the case cover with ease when mounting the case cover to a transmission case, even if the cavity is deep and the fastening elements are inaccessible to the assembler's fingers. The one-piece construction facilitated by the present invention may result in reduced cost, a simpler design, improved durability, reduced mass, reduced transmission length, simpler manufacturing and assembly, increased cover member stiffness, and better belt and sheave alignment compared to the prior art. Furthermore, the invention may enable the elimination of some external pressurized seals found in prior art case covers. Improved bearing life may also be achieved compared to the prior art because a one-piece case cover member flexes in similar fashion at the input sheave bearing and the output sheave bearing.

The above features and advantages, and other features and advantages, of the present invention are readily apparent from the following detailed description of the best mode for carrying out the invention when taken in connection with the accompanying drawings.

DESCRIPTION OF THE PREFERRED EMBODIMENT

Figure 1:
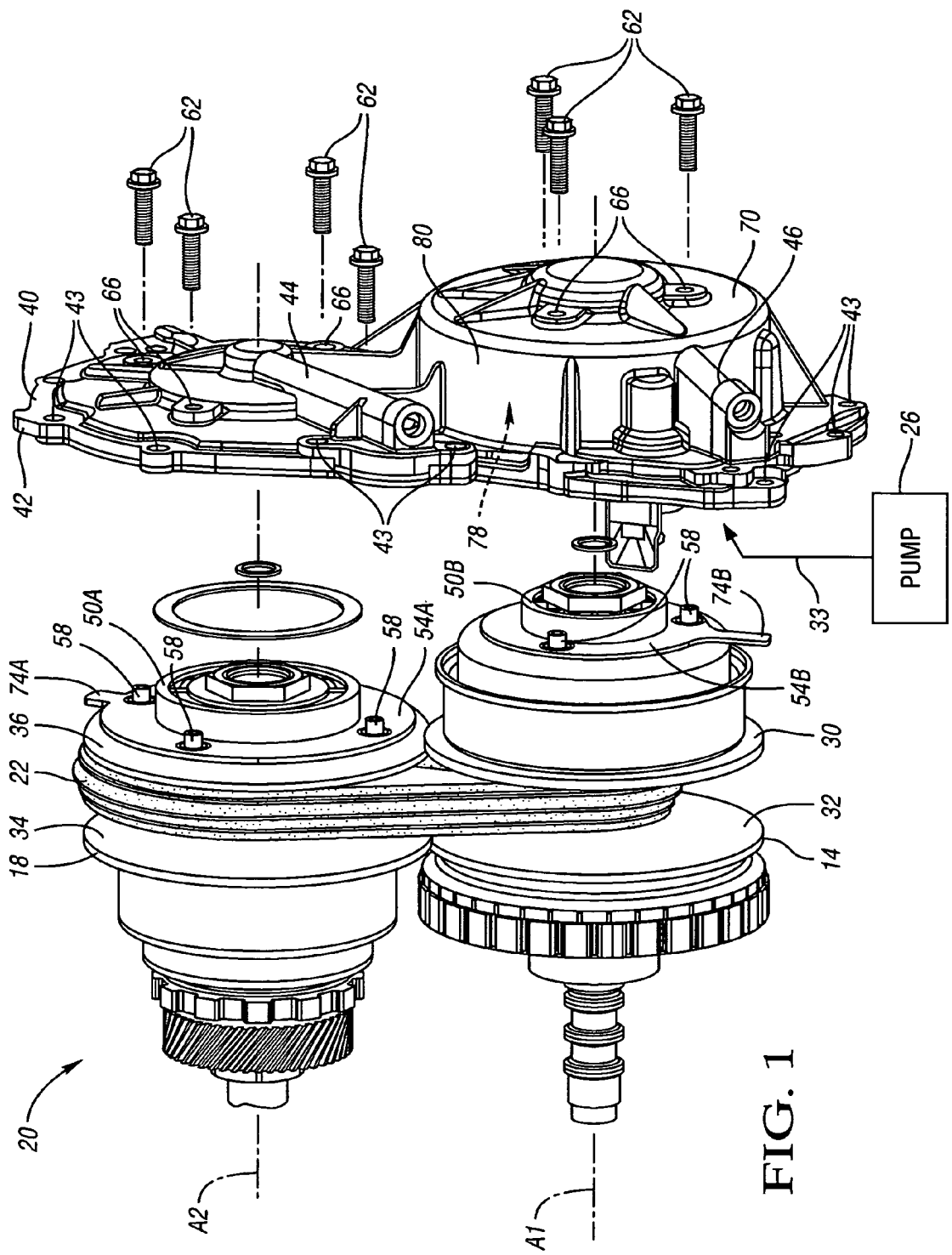
FIG. 1 is a schematic, partially exploded perspective view of a drive sheave assembly, a driven sheave assembly, and a case cover for a vehicular continuously variable transmission.

Referring to FIG. 1, a drive sheave assembly 14 and a driven sheave assembly 18 of a continuously variable transmission (CVT) 20 are schematically depicted. The drive sheave assembly 14 is driven by an engine crankshaft (not shown) for rotation about axis A1 via a transmission input shaft and clutch or torque converter. The driven sheave assembly 18 is rotatable about axis A2 and is drivingly connected with vehicle drive wheels (not shown). The drive sheave assembly 14 and the driven sheave assembly 18 are interconnected by a flexible transmitter 22 such as a belt. The drive sheave assembly 14 is adjustable so that the distance from axis A1 to where the flexible transmitter 22 engages the drive sheave assembly 14 is selectively adjustable. More specifically, the drive sheave assembly 14 is in fluid communication with a pressurized fluid source, such as a pump 26. The drive sheave assembly 14 includes a first portion 30 and a second portion 32. The first portion 30 is axially movable with respect to the second portion 32 in response to pressurized fluid 33 from the pump 26 thereby to alter the distance from the axis A1 to where the flexible transmitter 22 engages the drive sheave assembly 14.

In a similar manner, the driven sheave assembly 18 is in fluid communication with the pump 26. A first portion 34 of the driven sheave assembly 18 is axially movable with respect to a second portion 36 of the driven sheave assembly 18 in response to pressurized fluid 33 from the pump.

Exemplary CVTs with adjustable pulleys are described in U.S. Pat. No. 4,539,866, issued Sep. 10, 1985 to Koivunen, and U.S. Pat. No. 6,287,227, issued Sep. 11, 2001 to Vahabzadeh et al, both of which are hereby incorporated by reference in their entireties.

The drive sheave assembly 14 and the driven sheave assembly 18 are primarily contained within a transmission housing, or case (not shown). The case is closed off by a one-piece case cover member 40. The case cover member 40 is preferably cast aluminum, and includes an attachment flange 42 with holes 43 therein at which the case cover member 40 is mountable to the transmission case with threaded fasteners (not shown). The case cover member 40 also includes conduits 44, 46 formed therein for supplying pressurized fluid from the pump 26 to the sheave assemblies 14, 18. The conduits 44, 46 each include an inlet port (not shown) adjacent to the flange 42 for attachment to a corresponding outlet port on the transmission case to provide fluid communication between the pump 26 and the sheave assemblies 14, 18. Routing of pressurized fluid from the pump to drive sheave assembly 14 is more fully described in a commonly assigned, concurrently filed U.S. patent application Ser. No. entitled "Transmission Case Cover with Radial Inflow Channel" and having Ser. No. 10/833,343, which is hereby incorporated by reference in its entirety.

The sheave assemblies 14, 18 each include a bearing 50A, 50B and a stamped bearing retainer 54A, 54B for attachment to the case cover member 40 so that the case cover member rotatably supports the sheave assemblies 14, 18. The bearing retainers 54A, 54B include bearing retainer fastening elements thereon, such as integral flange nuts 58. The integral nuts 58 on each bearing retainer 54A, 54B have a predetermined spatial relationship with one another. The case cover member has case cover fastening elements thereon in the form of holes 66 in end wall 70. One set of holes 66 is arranged in the same predetermined spatial relationship with one another as the nuts 58 on bearing retainer 54A, and another set of holes 66 is arranged in the same predetermined spatial relationship with one another as the nuts 58 on bearing retainer 54B. The nuts 58 are engageable with threaded fasteners 62 through the holes 66 to fasten the bearing retainers 54A, 54B to the case cover member 40. Thus, the nuts 58 must align with the holes 66 during attachment of the case cover member 40 to the transmission housing. To achieve proper alignment, bearing retainers 54A, 54B are rotatable prior to being fastened to the case cover member 40. The bearing retainers 54A, 54B are generally ring-shaped and are each characterized by a respective protrusion 74A, 74B that extends radially outward. Threaded fasteners 62 are preferably sealed bolts.

When the case cover member 40 is operatively attached to the sheave assemblies 14, 18 and the transmission housing, the drive sheave assembly 14 is at least partially contained in a cavity 78 formed in the case cover member 40. In the embodiment depicted, the cavity 78 is sufficiently deep and narrow such that a transmission assembler cannot view or access the nuts 58 when the sheave assembly 14 is inserted into the cavity 78 during attachment of case cover member 40 to the transmission case.

Figure 2:
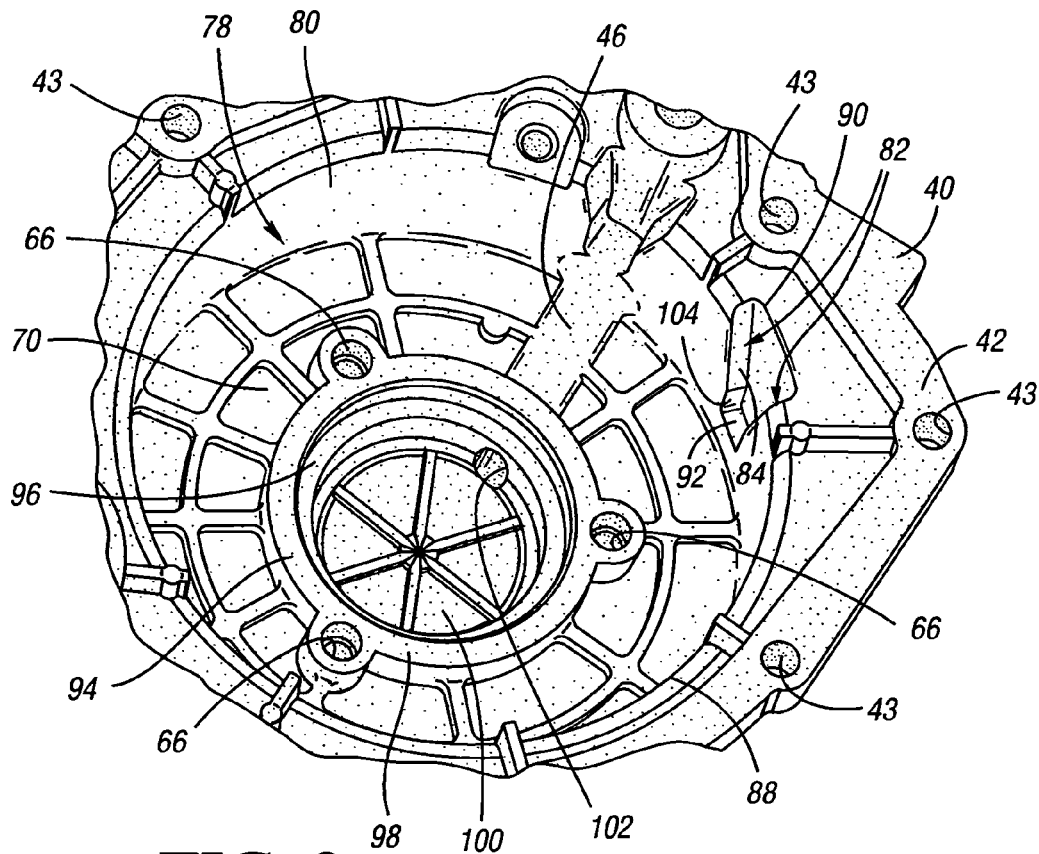
FIG. 2 is a schematic perspective view of a portion of the case cover of FIG. 1 that defines a cavity for containing at least a portion of the drive sheave assembly of FIG. 1.

Referring to FIG. 2, wherein like reference numbers refer to like components from FIG. 1, the cavity 78 is formed by end wall 70 and a generally cylindrical wall 80. The case cover member 40 includes two surfaces 82 that are spaced a distance apart from one another and that form a slot 84 therebetween. The slot 84 is adjacent to the cavity 78. The cavity 78 is open at one end 88 to receive the drive sheave. The slot 84 is open at one end 90 to receive at least a portion of the protrusion on the drive sheave's bearing retainer. The slot 84 is tapered so that its width is larger at the open end 90 than at a closed end 92. The slot 84 is an as-cast feature of the case cover member 40.

End wall 70 includes a formation 94 with an annular case cover shoulder 96 for supporting the bearing of the drive sheave assembly and a generally annular surface 98 that partially defines and surrounds holes 66. The formation 94 also partially defines a fluid chamber 100 into which conduit 46 supplies pressurized fluid through opening 102.

Figure 3:
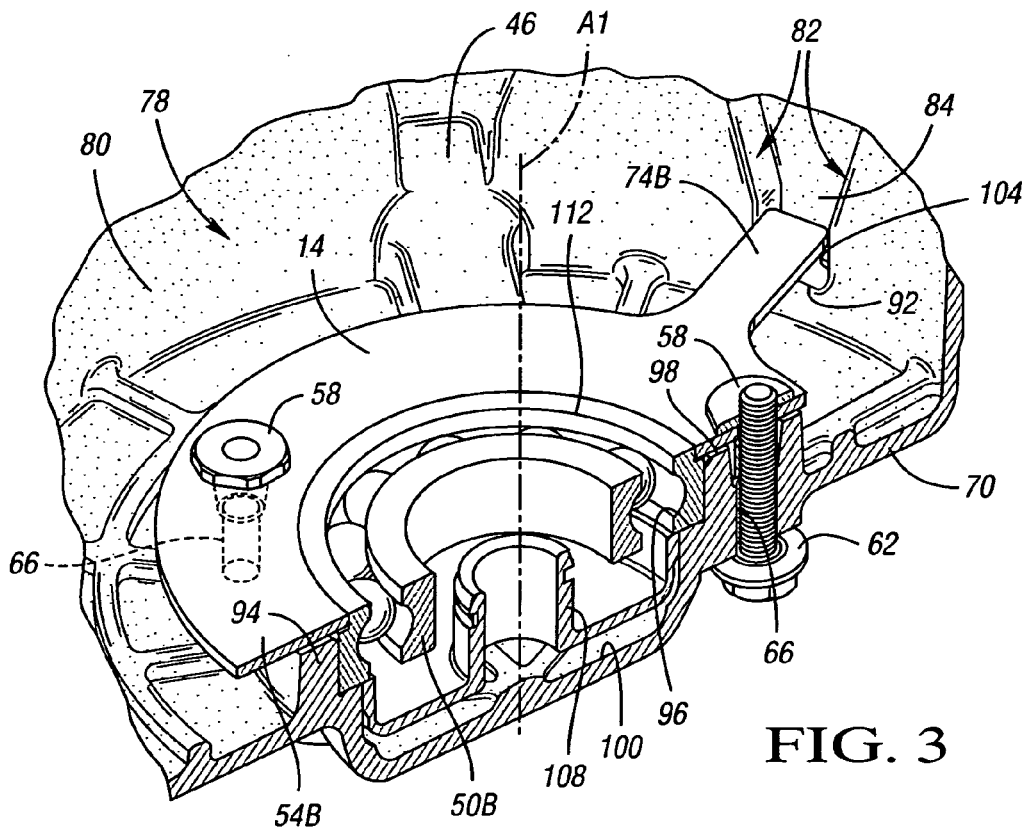
FIG. 3 is a schematic perspective view of the case cover with the bearing and bearing retainer of the drive sheave assembly attached thereto.

Referring to FIG. 3, wherein like reference numbers refer to like components from FIGS. 1 and 2, end portion 104 of the slot 84 is positioned and shaped so that when the bearing retainer protrusion 74B is located therein, each nut 58 on bearing retainer 54B is aligned with, and adjacent to, a corresponding hole 66. More specifically, the width of the slot 84 is sufficiently small at the end portion 104 to prevent any rotation of the bearing retainer 54B that results in misalignment of the nuts 58 and the holes 66.

Furthermore, the surfaces 82 act on the protrusion 74B as the sheave assembly enters and travels through the cavity 78 during assembly of the case cover member to the case, thereby rotating the bearing retainer 54B as necessary to ensure proper alignment of the holes and nuts. The slot 84 thus functions as a coarse alignment feature. The width of the slot 84 at end portion 104 is sufficiently wide to permit fine adjustment of the alignment of nuts 58 and holes 66 as described below in conjunction with FIG. 4.

Only the bearing 50B and the bearing retainer 54B of drive sheave assembly 14 are shown in FIG. 3. An insert 108 is provided in the formation 94 between the sheave assembly 14 and the case cover member 40 for directing fluid from the conduit 46 and the chamber 100 to the sheave assembly.

Figure 4:
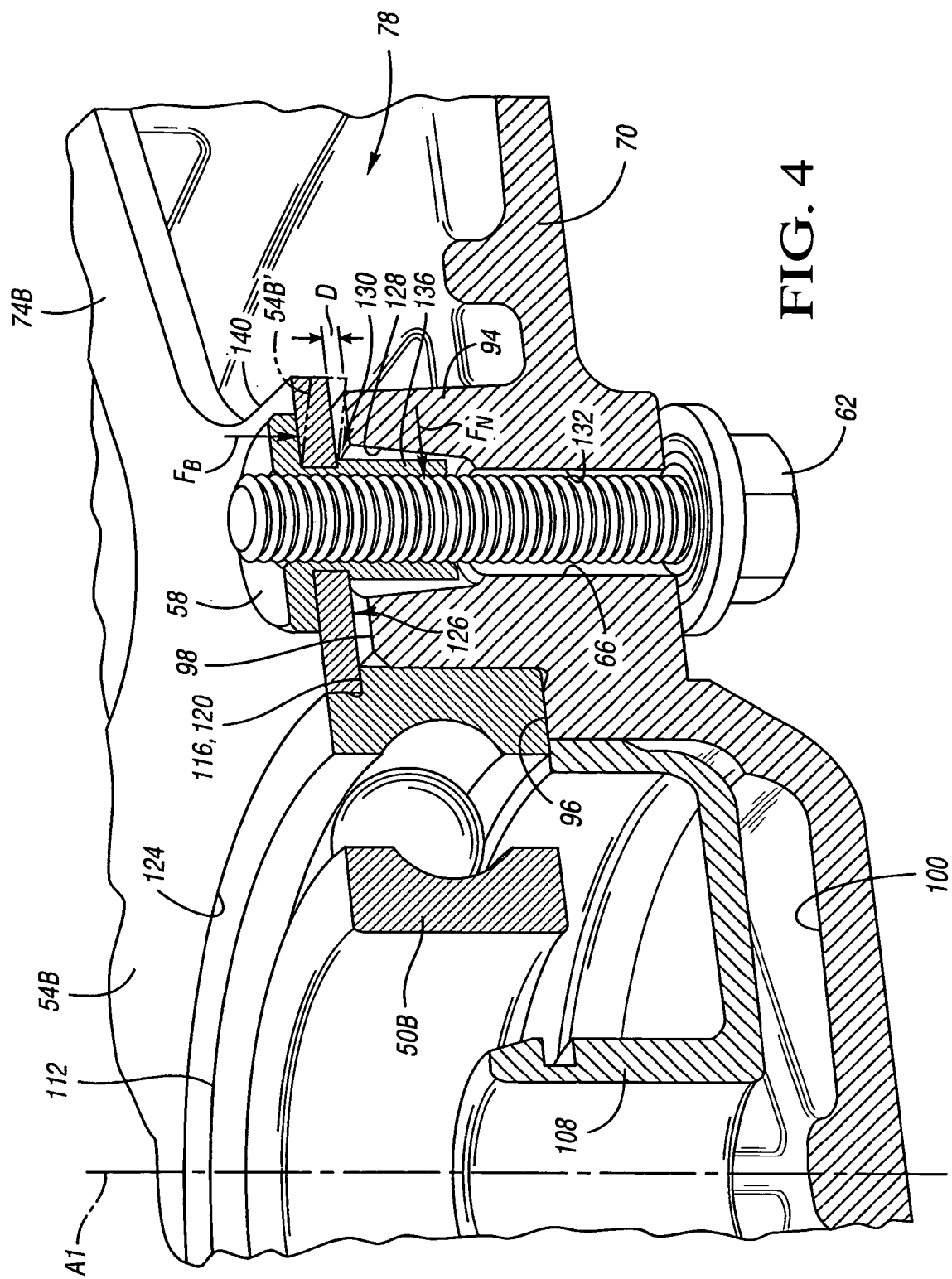
FIG. 4 is another schematic perspective view of the case cover with the bearing and bearing retainer attached thereto.

Referring to FIG. 4, wherein like reference numbers refer to like components from FIGS. 1-3, the race 112 of bearing 50B contacts the case cover shoulder 96. The race 112 includes a notch 116, partially formed by race shoulder 120, in which the inner diameter 124 of the bearing retainer 54B is located. Surface 126 of the bearing retainer 54B contacts race shoulder 120. The race 112 and formation 94, including shoulder 96 and surface 98, are sufficiently dimensioned such that surface 120 of notch 116 is protuberant with respect to surface 98 when the race 112 contacts the shoulder 96. Thus, race shoulder 120 maintains the bearing retainer 54B, and more specifically bearing retainer surface 126, a distance D from surface 98 such that there is a gap 130 between the bearing retainer 54B and surface 98 prior to the bolts 62 being sufficiently tightened.

Each of the holes 66 includes a tapered portion 128 wherein the hole diameter is largest at surface 98. The tapered portion 128 is an as-cast feature of the case cover member 40. A non-tapered portion 132 of each hole 66 is formed in a subsequent drilling operation.

Each nut 58 has a segment 136 that protrudes from surface 126 of the bearing retainer 54B. The diameter of each hole 66 at surface 98 is greater than the diameter of each segment 136. Tapered portions 128 guide the nuts 58 for alignment with non-tapered portions 132 and for engagement with threaded fasteners 62 as the segments 136 are inserted into holes 66. Tapered portions 128 thus function as fine alignment features.

The bearing retainer 54B includes a self-locking feature. More specifically, as the bolts 62 engage nuts 58 and are tightened, each bolt 62 exerts a force $F_B$ on one of the nuts 58 and, correspondingly, the bearing retainer 54B. The gap 130 allows the bearing retainer 54B to deform as a result of force $F_B$ such that the outer diameter 140 of the bearing retainer is drawn toward surface 98, and as a result each nut 58 exerts a lateral force $F_N$ against one of the bolts 62. The deformed bearing retainer is shown schematically in phantom at 54B'. In the context of the present invention, a "lateral force" exerted against a bolt is generally perpendicular to the bolt's axis. Preferably, the bearing retainer 54B is sufficiently deformed during bolt engagement such that the outer diameter 140 contacts surface 98 and the bearing retainer 54B is locked against the case cover member 40. The nuts 58 are designed to provide two diameters of thread engagement.

While the best mode for carrying out the invention has been described in detail, those familiar with the art to which this invention relates will recognize various alternative designs and embodiments for practicing the invention within the scope of the appended claims.

The invention claimed is:

1. A case cover for a continuously variable transmission having a sheave assembly including a bearing retainer with a plurality of nuts thereon, the case cover comprising:
   a wall defining a plurality of holes therein, the wall defining at least a portion of a cavity configured to contain a portion of the sheave assembly; and
   two surfaces defining a slot therebetween configured to contain a portion of the bearing retainer; wherein the cavity has an open end for receiving the portion of the sheave assembly; wherein the slot has an open end for receiving the portion of the bearing retainer; wherein the slot is sufficiently positioned and shaped such that, when the portion of the bearing retainer is inserted sufficiently into the slot, each of the nuts is sufficiently aligned with a respective one of the holes to enable a respective bolt to engage each of the nuts through the respective one of the holes.

2. The case cover of claim 1, wherein the slot is tapered such that when the portion of the bearing retainer is inserted into the slot, at least one of the surfaces acts on the portion of the bearing retainer as necessary to cause the plurality of nuts to align with the plurality of holes.

3. The case cover of claim 1, wherein the nuts each have a segment protruding from a surface of the bearing retainer; and wherein the holes are tapered to further align the nuts.

4. The case cover of claim 1, wherein the bearing retainer is generally ring-shaped and has a protrusion extending radially outward.

5. A continuously variable transmission comprising:
   a first sheave assembly having a bearing retainer with a plurality of nuts thereon;
   a case cover member having a wall defining a plurality of holes, the wall defining at least a portion of a cavity containing a portion of the sheave assembly, and two slot-defining surfaces defining a slot therebetween containing a portion of the bearing retainer; and
   a plurality of bolts each extending through a respective one of the holes and engaging a respective one of the nuts;
   wherein the slot is sufficiently shaped such that the two slot-defining surfaces prevent rotation of the bearing retainer that results in misalignment of the nuts and the holes.

6. The continuously variable transmission of claim 5, wherein the slot is tapered.

7. The continuously variable transmission of claim 5, wherein the nuts each have a segment protruding from a surface of the bearing retainer; and wherein the holes are tapered.

8. The continuously variable transmission of claim 5, wherein the bearing retainer is generally ring-shaped and has a protrusion extending radially outward at least partially into the slot.

9. The continuously variable transmission of claim 8, further comprising at least one hole-defining surface surrounding the holes; wherein the bearing includes a race; wherein the bearing retainer is characterized by an inner diameter and an outer diameter; wherein the race includes a portion that is protuberant with respect to said at least one hole-defining surface; wherein the inner diameter of the bearing retainer contacts said portion of the race; and wherein the bearing retainer is deformed as a result of tightening the bolts such that each of the nuts exerts a lateral force on one of the bolts.

10. The continuously variable transmission of claim 5, further comprising a second sheave assembly; wherein the case cover member is one-piece; and wherein the second sheave assembly is rotatably mounted to the case cover member.

11. A continuously variable transmission comprising:
   a sheave assembly having a generally ring-shaped bearing retainer with a plurality nuts thereon, each of the nuts having a segment protruding from a surface of the bearing retainer;
   a case cover member having a wall with a plurality tapered holes formed therein at which the sheave assembly is rotatably mounted, the wall defining at least a portion of a cavity containing a portion of the sheave assembly, and two slot-defining surfaces defining a tapered slot therebetween containing a portion of the bearing retainer;
   a plurality of bolts engaged with said nuts through said holes; and
   at least one hole-defining surface surrounding the holes; wherein the bearing includes a race; wherein the bearing retainer is characterized by an inner diameter and an outer diameter; wherein the race includes a portion that is protuberant with respect to said at least one hole-defining surface; wherein the inner diameter of the bearing retainer contacts said portion of the race; and wherein the bearing retainer is deformed as a result of tightening the bolts such that each of the nuts exerts a lateral force on one of the bolts.

* * * * *